United States Patent

[11] 3,629,693

| [72] | Inventor | John M. Anderson |
| | | Scotia, N.Y. |
| [21] | Appl. No. | 97,919 |
| [22] | Filed | Dec. 14, 1970 |
| [45] | Patented | Dec. 21, 1971 |
| [73] | Assignee | General Electric Company |

[54] HIGH-PERFORMANCE CURRENT TRANSFORMERS
10 Claims, 4 Drawing Figs.

[52] U.S. Cl. .................................................. 323/6,
323/47, 324/127, 336/175
[51] Int. Cl. .......................................... G01r 19/00,
H01f 40/06
[50] Field of Search ............................................ 321/9;
323/6, 44, 61, 74, 47; 324/127; 333/12, 77;
336/174, 175

[56] References Cited
UNITED STATES PATENTS

| 2,701,335 | 2/1955 | Sargeant et al. ............... | 336/175 X |
| 3,146,417 | 8/1964 | Pearson ........................ | 336/174 X |
| 3,475,682 | 10/1969 | Peek et al. ..................... | 324/127 |

*Primary Examiner*—A. D. Pellinen
*Attorneys*—John F. Ahern, Paul A. Frank, Richard R. Brainard, Jerome C. Suuillaro, Frank L. Neuhauser, Oscar B. Waddell and Joseph B. Forman

ABSTRACT: Current transformers which exhibit a uniform response and freedom from distortion as a function of frequency of currents sensed include a secondary winding having a number of turns about a suitable core. Oscillation-damping resistances are connected between electrically uniformly spaced points along the secondary winding and a common low-inductance conductor.

PATENTED DEC 21 1971 3,629,693
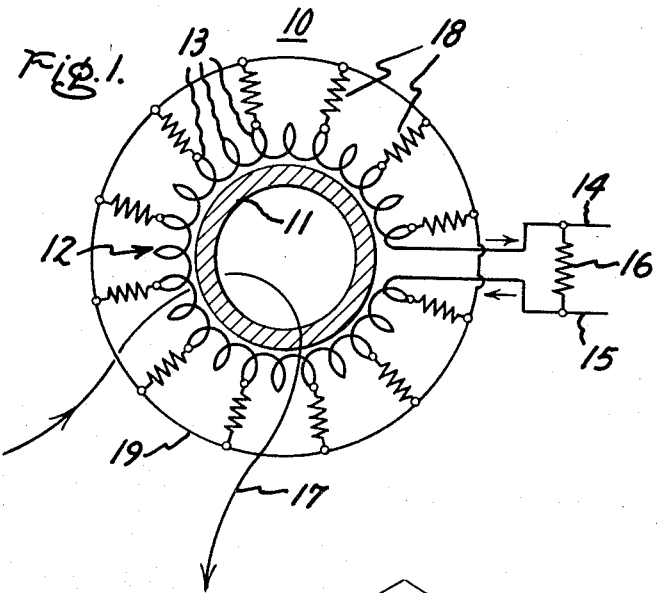
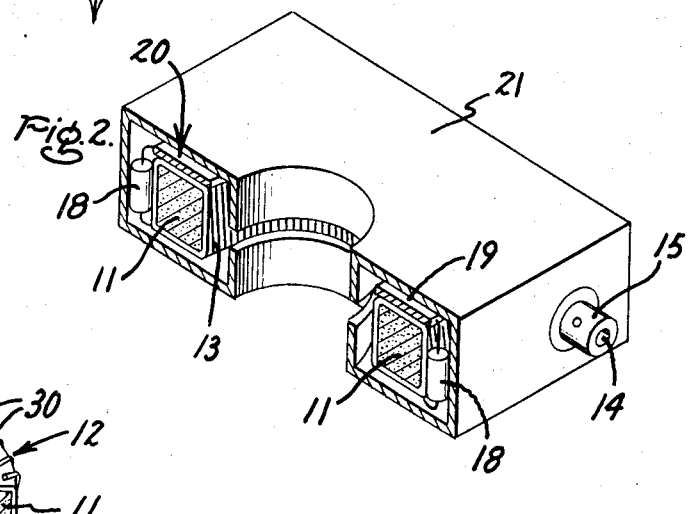
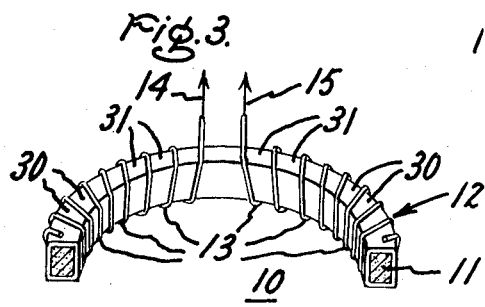
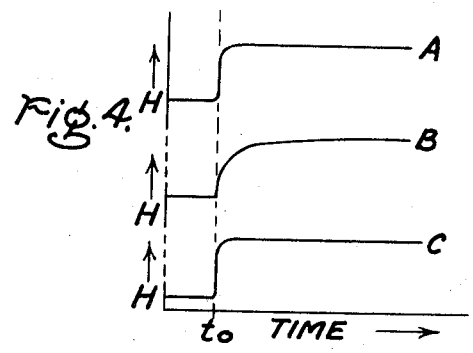
Inventor:
John M. Anderson,
by John F. Ahern
His Attorney.

HIGH-PERFORMANCE CURRENT TRANSFORMERS

This invention is directed to improved high-performance current transformers. More particularly, the invention is directed to such transformers as provide nondistorted, uniform response over a wide range of frequencies of currents sensed, particularly at high frequencies. This application is related to my copending, concurrently filed application, Ser. No. 97,918 which is assigned to the assignee of this invention and incorporated herein by reference thereto.

In general, current transformers provide a means for measuring currents, particularly time-varying currents, without physically interrupting the current-carrying conductor or physically placing a resistive load in the measured circuit. A current transformer includes a loop secondary winding through which the conductor carrying the measured current is passed as a one-turn primary.

Current transformers provide unique advantages in the measurement of time-varying currents. The use of such transformers permits isolation from high voltage and freedom from spurious ground currents. Additionally, even though some resistance is reflected from the secondary winding into the circuit, the current of which is being sensed, such reflected resistances are considerably less than resistances interposed by resistive current monitors.

Although current transformers are ideal for measurement of low-frequency time-varying currents and have recently been utilized in high-frequency current measurements, the use thereof at high frequencies is accompanied with problems which require careful design criteria and which limit the utility thereof.

In general, any current transformer adapted to operate at high frequencies tends to exhibit a low (ixt) figure of merit. Every current transformer has a range of frequencies over which satisfactory performance is attained. Usually, at the high frequency end of this range, for any given current transformer, the response of the device becomes nonuniform. Such nonuniformities are indicated by a higher response for high-frequency components of current and a lower response for low-frequency components of current, resulting in a distorted output. Additionally, at high frequencies, the response time of the transformer, that is, the time necessary for the transformer accurately to reflect the current change occurring in the primary, becomes unsatisfactorily long.

Accordingly, it is an object of the invention to provide current transformers having an optimum balance between figure of merit and broadband operation.

Another abject of the invention is to provide current transformers having undistorted high-frequency response.

Still another object of the invention is to remove spurious oscillations at operating frequencies from high-frequency current transformers.

Yet another object of the invention is to improve the response-time characteristic of current transformers at high frequencies of operation.

Briefly stated, in accord with one embodiment of the invention, I provide a current transformer in the form of a toroidal core adapted to surround a time-varying current carrying conductor and including a secondary winding in the form of a plurality of turns about the core. The secondary winding is terminated in a characteristic impedance which is kept very low to enhance high-frequency response. A plurality of oscillation-damping resistances are connected between electrically uniformly spaced points along the secondary winding and a common conductor. In accord with another embodiment of the invention, the distance between the turns of the secondary winding in the vicinity of the secondary winding leads is increased to improve the rise-time characteristics of the transformer.

The novel features believed characteristic of the invention are set forth in the appended claims. The invention itself, together with further objects and advantages thereof, may best be understood by referring to the attached drawing in which:

FIG. 1 is a schematic representation of the electrical circuit of a current transformer constructed in accord with one embodiment of the invention, FIG. 2 is a cross-sectional perspective view of a current transformer such as that is illustrated schematically in FIG. 1, FIG. 3 is a schematic illustration of yet another feature of a current transformer constructed in accord with the present invention, and FIG. 4 is a graphical illustration showing typical oscilloscope current traces and illustrating the advantages of the embodiment of the invention illustrated in FIG. 3.

There is no single embodiment for a current transformer that is optimum for all uses. Due to the many criteria such as frequency response, figure of merit, and degree of freedom from distortion, generally a current transformer is designed to optimize the requirements of its intended use. Thus, for example, a current transformer optimized for use in measuring large sinusoidal currents at 60 hertz is generally limited at its high-frequency end to a frequency in the low megahertz range. On the other hand, a transformer optimized primarily for microwave applications can be expected to have a poor low-frequency response and a relatively low figure of merit. The final characteristics of any particular current transformer results in a balancing of the respective criteria and the optimizing thereof according to the need. In general, one cannot have optimum of all of the categories of frequency response, figure of merit, and sensitivity, for example.

Although the characteristics of the present invention and the concepts thereof are equally applicable for the improvement of all current transformers for the measurement of frequencies of the order of 10 kilohertz or higher, the invention will be described primarily with respect to transformers adapted to function in the microwave region at frequencies of approximately 10 kilohertz to the order of one gigahertz.

FIG. 1 illustrates a current transformer 10, by a schematic electrical representation, constructed in accord with the present invention. Transformer 10 includes a core 11, which may be a series of ferromagnetic laminations for low-frequency usage, a ferrite core for intermediate and high-frequency usages, or an air core consisting essentially of a winding spool for very high frequency operation. A secondary winding 12 includes a plurality of turns 13 which encircle core 11 and which terminate in a pair of secondary winding leads 14 and 15. Winding 12 is wound about the core 11 and is electrically terminated in an impedance 16, which is resistive and which is chosen to be of a very low value as compared with load resistances of the prior art in order to optimize the high-frequency response of the transformer. Transformer 10 also includes, in accord with the invention, a plurality of oscillation-damping resistances 18 which are connected in electrical periodic fashion between every nth turn 13 of secondary winding 12 and a common electrical conductor 19, which may be a flat circular washer and which is preferably not electrically tied to any other portion of the transformer.

FIG. 2 illustrates a current transformer shown in sectioned perspective view and shows a typical structure for a high frequency transformer constructed in accord with the invention such as is illustrated schematically in FIGURE 1. Core 11 comprises a substantially square cross-sectioned core of a ferrite material such as 06 Ferrite material Indiana General, size (CF111), about which a plurality of windings, as for example 50 to 100, of a suitable insulated coil grade copper alloy wire, are wound to provide the electrical circuit illustrated in FIG. 1. A plurality of lumped parameter resistances 18 are interposed between every preselected number, as for example, every other, every third, every fourth, or every fifth of turns 13, and a common low inductance disc-shaped electrical conductor 20, which is preferably not electrically connected to any other portion of the transformer. The output of the transformer is taken from coaxial leads 14 and 15 which are emergant from the shield 21 containing the transformer assembly.

In the operation of a current transformer, the current developed in the secondary, to be useful, must faithfully image the current in the primary 17 which passes through the core and the secondary winding. In theory, there should be no problem with such faithful reproduction. As a practical matter, any asymmetry in the fabrication of the transformer or in locating the primary such as to cause it not to pass precisely coaxially and symmetrically through the center of the current transformer core, and hence the secondary winding, causes nonuniform excitation of the various turns 13 of the secondary winding 12. The secondary winding of a current transformer possesses inherent capacitances which, coupled with the core inductance, may support parasitic oscillations. Any lack of symmetry, either electrical or mechanical, in the fabrication of the transformer or the electrical coupling of the primary thereto, may cause such parasitic oscillations. Such parasitic oscillations are inherent in current transformers and heretofore have provided a limiting factor upon the operation thereof, particularly at high frequencies.

In accord with the present invention, I provide lumped resistances along the length of the secondary winding which resistances are connected between periodic spaced turns of the secondary winding and a common low-inductance conductor which is connected only to the other ends of the respective resistances. The resistive network provides damping means for sufficiently damping the oscillations caused by lack of symmetry in the current transformer or its feed, such that the natural resonant frequency of the transformer is raised to a value far in excess of the desired operating range thereof.

Current transformers constructed in accord with the present invention may be utilized to sense currents of from 0.1 to $10^6$ amperes. Time-varying currents having characteristic frequencies of from approximately 1 hertz to 10 gigahertz may be sensed providing, however, that the appropriate and well-understood design modifications are made in order that the structure utilized for the transformer be compatible with the frequency sensed. Thus, for example, iron core transformers may be utilized to sense frequencies varying from approximately $10^{-4}$ hertz to approximately 1 megahertz. Ferrite transformers may be utilized in the range of from approximately 0.5 hertz to approximately 10 gigahertz. At very high frequencies, air core transformers are utilized in the range of 10 megahertz to 100 gigahertz. Although there is some overlapping in these ranges, this is understandable, since each type transformer core may operate on a broad band of frequencies, although not perhaps at optimum efficiency throughout. Other parameters which are generally varied with the operating frequency are the number of turns utilized and the diameter of the core. Generally, the core diameter is large for low frequencies and relatively small for high frequencies. Similarly, a large number of turns, of for example up to 1,000, may be utilized for very low frequencies, whereas a small number of turns, as low as 10, may be utilized for very high frequencies. For frequencies of approximately 10 kilohertz to 100 megahertz, approximately 50 to 100 turns are quite suitable and I have constructed a number of transformers in accord with the present invention having the number of turns within this range.

In accord with the present invention, I utilize load resistances up to approximately 1,000 ohms and, in the frequency range of 1 hertz to 100 megahertz, the load resistances utilized are preferably in the range of 0.1 ohm to 50 ohms. Selection of the exact resistance depends upon a balance between good high frequency response, which is favored by a low load resistance, and a high sensitivity which is favored by a high resistance. The resistances utilized to damp spurious oscillations in accord with this invention are inserted periodically, so as to be electrically symmetrically located among the number of turns. Thus, for example, if a 100-turn secondary is utilized, the oscillation-damping resistances are characteristically inserted so as to utilize either 5, 10, 25, 50 or 100 resistances. Preferably, the resistances should be inserted no more frequently than every other turn and no less frequently than every fourth turn.

The value of the damping resistances depend somewhat upon the frequency range of operation. In general, however, a 10,000 ohm resistance or less is suitable. For transformers operating in the range of 10 kilohertz to 100 megahertz, a resistance of 3,000 ohms or less is indicated and approximately 1,000 ohms resistance placed between every other turn is preferred.

One current transformer constructed in accord with the present invention and adapted to operate at frequencies of approximately 1.5 kilohertz to 3 gigahertz utilized a ferrite core of 06 Indiana General size CF111 Core Material having a 0.87-inch O.D., a 0.45-inch I.D., and a 0.25 inch thickness upon which was wound a secondary winding of 50 turns of 23 gauge double enameled copper wire, which yielded a low-frequency inductance of 7.8 millihenries and a DC resistance of 0.09 ohms. Twenty-five 1,000 ohm, one eighth watt, 1percent metal film lumped constant resistors were respectively connected between every other turn and a common noninductive conductor. The rise time, that is the time for the secondary faithfully to duplicate, to 90 percent a pulse impressed through the primary, was approximately 0.1 nanosecond and the device exhibited a sensitivity of 1 volt per ampere. The figure of merit, utilizing a 50 ohm load which reflected $2\times10^{-2}$ ohms into the primary, with a continuous current of 7 amperes and 500 amperes peak at 1 watt input, was 420 ampere-microseconds.

Another transformer adapted to operate in a frequency range of approximately 0.5 hertz to 100 megahertz and to give a higher figure of merit was constructed using a core of the same ferrite material as the previously described transformer, but having an outside diameter of 3.50 inches, an inside diameter of 2.0 inches and a thickness of 0.5 inches. This transformer had 100 turns of No. 16 insulated magnet wire as the secondary. The DC resistance of the coil was 0.095 ohms and its inductance was 41 millihenries. Twenty-five damping resistors of 1,000 ohms each were spaced every four turns around the secondary coil and were adequate to dampen all coil resonance within the operating frequency range. This transformer exhibited a rise time of 3 nanoseconds, a sensitivity of $10^{-3}$ to $10^{-2}$ volts per ampere and a figure of merit of 6 ampere-seconds calculated at 400 ampere continuous current with a 2 watt input and a load resistance of 0.1 to 1 ohms, causing a reflected resistance into the primary of approximately $2\times10^{-5}$ ohms.

Yet another transformer, constructed in accord with the present invention to operate at frequencies as low as $4\times10^{-4}$ hertz, utilized a laminated iron core transformer having an O.D. of 5 inches and an I.D. of 3.25 inches and a height of 1.5 inches. Around the core, 100 turns of No. 12 round magnet were were wound uniformly. The secondary winding exhibited an inductance of 38 henries at 1 kilohertz and had a DC resistance of 0.0675 ohms and comprised 50 damping resistors of 1,200 ohms each connected between every other turn respectively and a common conductor. A 0.1 ohm terminating resistance was utilized causing a reflected resistance in the primary of $1.7\times10^{-5}$ ohms. The range of operating frequency was approximately $10^{-3}$ Hertz to 100 megahertz. The rise time was 3 nanoseconds and the sensitivity was approximately $10^{-3}$ volts per ampere.

All of the previously described transformers were coaxially fed with a current carrying primary.

In accordance with another feature of the present invention I avoid the degradation of rise time. Rise time is the time which is required, from the initiation of a square wave pulse in the primary of a current transformer, to cause the maximum voltage to be reflected in the secondary of the transformer, generally defined as the time between 10 percent and 90 percent of maximum response. In high-current transformers, there is a strong tendency for the rise time thereof to be slow. I have discovered that a specific winding of the secondary of current transformers, wherein the density of windings immediately adjacent the output leads, from the secondary winding to the load resistance, is substantially less than the density of windings in the remainder of the secondary coil, tends to eliminate or minimize this problem.

FIG. 3 of the drawing illustrates schematically a portion of the secondary winding 12 of transformer 10 on core 11 wherein the density of turns 13 has such a nonuniform spacing. In FIG. 3, the spacing 30 between most turns 13 has a first predetermined value. In the general vicinity of the output leads 14 and 15, however, the spacing 31 between turns 13 is increased to a maximum of approximately double that of spacing 30. This increase in spacing between these turns has the effect of causing the output current waveform at this time to be primarily influenced by the minimal density of turns in the region immediately adjacent the output leads. Since there is a finite delay along the transformer secondary before the signals induced in turns 13 at the more remote regions reach the output leads, the initial portion of the secondary characteristic is influenced by the output from the immediately adjacent turns. In practice, I find that for transformers adapted to operate in the 1.5 kilohertz to 3 gigahertz range, it is sufficient that a region of approximately 10° to 20° of arc in the vicinity of the output leads of the current transformer have an increased spacing between individual turns to produce a very favorable rise time characteristic.

FIG. 4 of the drawing illustrates typical current traces indicative of the advantages gained by the embodiment of the invention illustrated in FIG. 3. In FIG. 4, current traces from an oscilloscope are plotted on a same time base, but on separate current scales in order to compare identical time characteristics thereof. Curve A illustrates the current in the primary, or the current carrying conductor, being sensed. Curves B and C represent the current characteristic of the secondary winding. At a time $t$ a square wave front is impressed upon the primary winding and is indicated by the sharp inflection in Curve A. curve B, illustrates the current response of a current transformer secondary which has a uniform density, tightly packed winding. As may be seen from FIG. 4, the current represented by curve B undergoes a substantial time delay before the maximum amplitude of current is reached after the time $t$. Curve C represents the current in the secondary of a current transformer constructed as is illustrated schematically in FIG. 3. As may be seen from curve C, the secondary current very nearly approximates the primary current of curve A and the rise time is very short. While the specific figures given with respect to the degrees of arc and the relative densities of windings in the region adjacent the output leads and the remainder of the coil, have been given with respect to one frequency range current transformer, obviously this is a design parameter which those skilled in the art may readily apply to other ranges and designs of transformers.

By the foregoing, there has been disclosed improvements in high-frequency transformers which makes possible the attainment of undistorted high frequency operation without sacrificing figure of merit. Similarly, there is disclosed means for avoiding the degradation of rise time in high-frequency current transformers.

While the invention has been set forth herein with respect to certain embodiments and specific examples thereof, many modifications and changes will readily occur to those skilled in the art. Accordingly, I intend by the appended claims to cover all such modifications and changes as fall within the true spirit and scope of the foregoing disclosure.

What I claim as new and desire to secure by Letters Patent of the United States is:

1. Current transformer apparatus comprising:
   a. a toroidal core adapted to surround a current carrying conductor the current of which is to be sensed;
   b. a secondary winding wound about said core;
   c. load resistive means across the ends of said secondary winding; and
   d. a plurality of oscillation-damping resistances symmetrically connected between periodic points along the length of said secondary winding and a common electrical conductor.

2. The current transformer of claim 1 wherein said secondary winding includes a number of turns about said core of from approximately 50 to 100.

3. The current transformer of claim 1 where the inductance of said common electrical conductor is minimized.

4. The current transformer of claim 1 wherein said damping resistances are each of a value of approximately less than 10,000 ohms.

5. The current transformer of claim 1 wherein said damping resistances are each of a value of approximately less than 3,000 ohms.

6. The current transformer of claim 1 wherein said core is made from ferromagnetic laminations and the operating frequency of the transformer is in the range of approximately $10^{-4}$ Hz. to 10 MHz.

7. The current transformer of claim 1 wherein said core is made from a ferrite and the operating frequency of the transformer is in the range of approximately 0.5 Hz. to 10 GHz.

8. The current transformer of claim 1 wherein said core is nonferromagnetic and the high efficiency operating range of the transformer is at frequencies of approximately 10 MHz. to 100 GHz.

9. The current transformer of claim 1 wherein the spacing between turns of said secondary windings adjacent the output leads thereof are substantially greater than between turns of the remainder of said secondary winding.

10. The current transformer of claim 9 wherein the region of greater than normal spacing between windings extends for approximately 10° to 20° of arc surrounding said output leads.

* * * * *